(12) United States Patent
Shimada (10) Patent No.: US 8,941,768 B2
(45) Date of Patent: Jan. 27, 2015

(54) ELECTRONIC DEVICE CONTROL SYSTEM HAVING IMAGE DISPLAYING FUNCTION AND IMAGE CAPTURING FUNCTION

(75) Inventor: Daisuke Shimada, Yokohama (JP)

(73) Assignee: Kyocera Corporation, Kyoto (JP)

(*) Notice: Subject to any disclaimer, the term of this patent is extended or adjusted under 35 U.S.C. 154(b) by 307 days.

(21) Appl. No.: 13/392,161

(22) PCT Filed: Aug. 26, 2010

(86) PCT No.: PCT/JP2010/064519
§ 371 (c)(1),
(2), (4) Date: Feb. 24, 2012

(87) PCT Pub. No.: WO2011/024915
PCT Pub. Date: Mar. 3, 2011

(65) Prior Publication Data
US 2012/0154661 A1    Jun. 21, 2012

(30) Foreign Application Priority Data
Aug. 27, 2009   (JP) .................................. 2009-197435

(51) Int. Cl.
*H04N 5/222* (2006.01)
*A63F 9/24* (2006.01)
*A63F 13/00* (2014.01)
*G06F 17/00* (2006.01)
*G06F 19/00* (2011.01)
*G03B 21/14* (2006.01)
*H04N 5/232* (2006.01)

(52) U.S. Cl.
CPC ............ *G03B 21/14* (2013.01); *H04N 5/23248* (2013.01); *H04N 5/23254* (2013.01); *H04N 5/23293* (2013.01)

USPC .............................................. 348/333.1; 463/2

(58) Field of Classification Search
USPC ....................................................... 348/333.1
See application file for complete search history.

(56) References Cited

U.S. PATENT DOCUMENTS

| | | | |
|---|---|---|---|
| 6,308,565 B1* | 10/2001 | French et al. ............... | 73/379.04 |
| 2003/0109298 A1 | 6/2003 | Oishi et al. | |
| 2004/0102247 A1* | 5/2004 | Smoot et al. ................... | 463/36 |
| 2009/0117958 A1* | 5/2009 | Ueshima et al. ................... | 463/8 |

(Continued)

FOREIGN PATENT DOCUMENTS

| | | | |
|---|---|---|---|
| JP | 6301475 A | 10/1994 | |
| JP | 200232092 A | 1/2002 | |

(Continued)

OTHER PUBLICATIONS

International Search Report and Written Opinion of PCT/JP2010/064519 dated Oct. 12, 2010.

(Continued)

*Primary Examiner* — Albert Cutler
(74) *Attorney, Agent, or Firm* — Lowe Hauptman & Ham, LLP (57) ABSTRACT

According to an aspect, an electronic device includes an image display unit, an image taking unit, and a control unit. The image display unit displays a first image. The image taking unit takes a second image of a target object. The control unit detects a motion of the target object in the second image taken by the image taking unit, and changes the first image displayed by the image display unit in accordance with the detected motion of the target object.

2 Claims, 8 Drawing Sheets

(56) References Cited

U.S. PATENT DOCUMENTS

2009/0209336 A1* 8/2009 Onodera et al. ............... 463/31
2009/0268949 A1* 10/2009 Ueshima et al. ............. 382/107

FOREIGN PATENT DOCUMENTS

| | | | |
|---|---|---|---|
| JP | 2003175279 | A | 6/2003 |
| JP | 2003199972 | A | 7/2003 |
| JP | 2005114996 | A | 4/2005 |
| JP | 2006192080 | A | 7/2006 |
| JP | 2007096542 | A | 4/2007 |
| JP | 2007-143748 | A | 6/2007 |
| JP | 2008287142 | A | 11/2008 |
| JP | 2009-022440 | A | 2/2009 |

OTHER PUBLICATIONS

Office Action mailed Oct. 15, 2013, corresponds to Japanese patent application No. 2013-087651, for which an explanation of relevance is attached.

Office Action corresponding to JP2009-197435, dated Dec. 25, 2012.

* cited by examiner

ELECTRONIC DEVICE CONTROL SYSTEM HAVING IMAGE DISPLAYING FUNCTION AND IMAGE CAPTURING FUNCTION

CROSS-REFERENCE TO RELATED APPLICATION

This application is a National Stage of PCT international application Ser. No. PCT/JP2010/064519 filed on Aug. 26, 2010 which designates the United States, and which is based upon and claims the benefit of priority from Japanese Patent Application No. 2009-197435, filed on Aug. 27, 2009.

FIELD

The present disclosure relates to an electronic device that includes a display unit for displaying an image and an image taking unit for acquiring an image.

BACKGROUND

Conventional image-displaying electronic devices include devices that display an image on a predetermined display screen, such as cathode-ray tubes and liquid crystal displays, and devices that project an image on a wall surface or a screen, such as projectors.

The most common projectors are known as "stationary projectors", which receive power from a commercial power supply and operate in a certain fixed position. Stationary projectors project, in a fixed position, an image on a fixed position of a wall surface or a screen. Portable projectors have been proposed recently that are small and easy to carry around. For example, Patent Literature 1 describes a projector-function-equipped mobile terminal that includes an upper cabinet, a lower cabinet, and a hinge unit that rotatably joins the upper cabinet and the lower cabinet together, and the terminal also includes a projector that includes a lens and a light source.

Some electronic devices have both an image displaying function and an image taking function. For example, Patent Literature 2 describes a projector device that includes a projector unit that projects a projection image received from an external device on a screen; an image taking unit that takes an image of the screen and creates the taken image; and a written-data storage unit that stores therein written data that is directly written onto the screen in association with the projector image.

CITATION LIST

Patent Literature

Patent Literature 1: Japanese Patent Application Laid-Open No. 2007-96542
Patent Literature 2: Japanese Patent Application Laid-Open No. 2005-114996

TECHNICAL PROBLEM

The device described in Patent Literature 2 uses the image taking unit to detect written data that is written on a screen by an operator and stores therein the written data; with this configuration, it can detect an operation performed by the operator and can process the displayed image.

Because the device described in Patent Literature 2 stores an image that an operator writes on the screen with a writing tool, the image projection screen needs to be a writable screen. Moreover, because an operator actually writes character information, etc., on the screen, it is necessary to delete the written information from the screen each time images are switched, which is a troublesome operation. Moreover, the device described in Patent Literature 2 reads information written on the screen merely in the form of an image, and an operation of the operation unit is needed for various operations, such as the operation of switching images that appear on the screen.

For the foregoing reasons, there is a need for an easy-to-operate electronic device that allows a user to manipulate an image to be displayed with an easy operation.

SUMMARY

According to an aspect, an electronic device includes: an image display unit for displaying a first image; an image taking unit for taking a second image of a target object; and a control unit for detecting a motion of the target object in the second image taken by the image taking unit and for changing the first image displayed by the image display unit in accordance with the detected motion of the target object.

According to another aspect, when a predetermined motion of the target object is detected, the control unit switches the first image to be displayed by the image display unit to another image.

According to another aspect, the control unit estimates a momentum of the target object from the motion of the target object and changes the first image displayed by the image display unit in accordance with the estimated momentum.

According to another aspect, the control unit displays the target object included in the second image taken by the image taking unit on the first image displayed by the image display unit.

According to another aspect, the image display unit displays the first image by projecting the first image.

According to another aspect, the image taking unit takes, as the second image, an image of a location apart from a projection area to which the image display unit projects the first image.

According to another aspect, the motion of the target object is a motion of a person who performs an exercise.

According to another aspect, the control unit extracts sections of the person from the second image and determined the motion of the person base on a motion of each section.

According to another aspect, the control unit extracts light having a predetermined wavelength from the second image to determine the target object.

According to another aspect, the control unit switches the way of controlling an image to be displayed by the image display unit depending on a wavelength of detected light.

ADVANTAGEOUS EFFECTS OF INVENTION

An electronic device according to the present invention can control an image to be displayed by an image display unit in accordance with the motion of a target object that is acquired by an image taking unit.

DESCRIPTION OF EMBODIMENTS

The present invention will be explained in detail below with reference to the accompanying drawings. The present invention is not limited to the following explanation. Moreover, the components in the description below include those that will readily occur to those in the art, those that are substantially identical to the components, and those within what is called as the scope of equivalents. Although, in the following examples, the electronic device is a mobile phone, a present-invention applicable object is not limited to a mobile phone. For example, the present invention is applicable to various portable electronic devices, such as PHSs (Personal Handy-phone Systems), PDAs, videocamera recorders, portable navigators, portable computers, and portable gaming devices, and stationary electronic devices, such as image display devices (e.g., TV monitors), stationary projectors, and game consoles.

Figure 1:
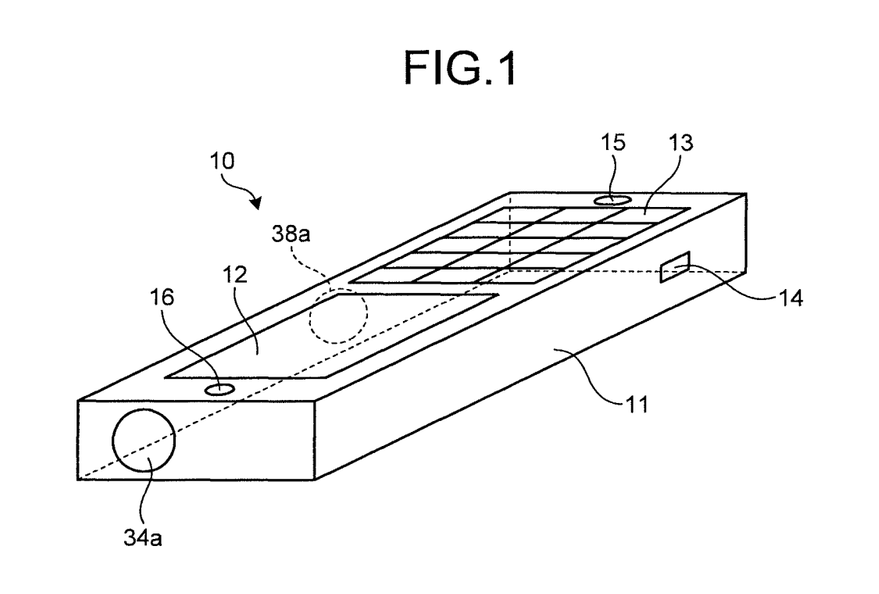
FIG. 1 is a perspective view of the configuration of a portable electronic device according to an embodiment.

The appearance of the configuration of a portable electronic device will be explained below. FIG. 1 is a perspective view of the configuration of a portable electronic device according to an embodiment. A portable electronic device 10 is a mobile phone that has a wireless communication function. The portable electronic device 10 is a straight-shaped mobile phone that has one box-shaped housing 11 and various units accommodated in the housing 11. Although, in the present embodiment, the housing 11 is one box-shaped housing, the housing 11 can be a foldable housing that is formed with two components connected to each other with a hinge or a housing formed with two sliding components.

The housing 11 includes, as illustrated in FIG. 1, a display 12 that operates as a display unit. The display 12 displays a predetermined stand-by image thereon when the portable electronic device 10 is in a receive stand-by mode and displays a menu image that is used to help operations of the portable electronic device 10.

The housing 11 has a plurality of operation keys 13 that are used to input phone numbers of an intended party or input texts for composing a mail, etc. A dedicated key 14 is provided on one side portion of the housing 11 (one surface that is substantially perpendicular to the surface on which the operation keys 13 are provided) to control the operations of a later-described projector 34. The operation keys 13 and the dedicated key 14 together form an operation unit of the portable electronic device 10. The housing 11 also includes a microphone 15 that receives voice when the portable electronic device 10 is in calling mode and a receiver 16 that emits voice when the portable electronic device 10 is in calling mode.

On an upper surface of the housing 11 (that has one side in contact with the surface on which the operation keys 13 are provided and another side in contact with the surface on which the dedicated key 14 is provided) is a light emitting section 34a of the projector 34 that projects an image. On a surface of the housing 11 opposite to the surface on which the dedicated key 14 is provided is an image taking section 38a of an image taking unit 38.

Figure 2:
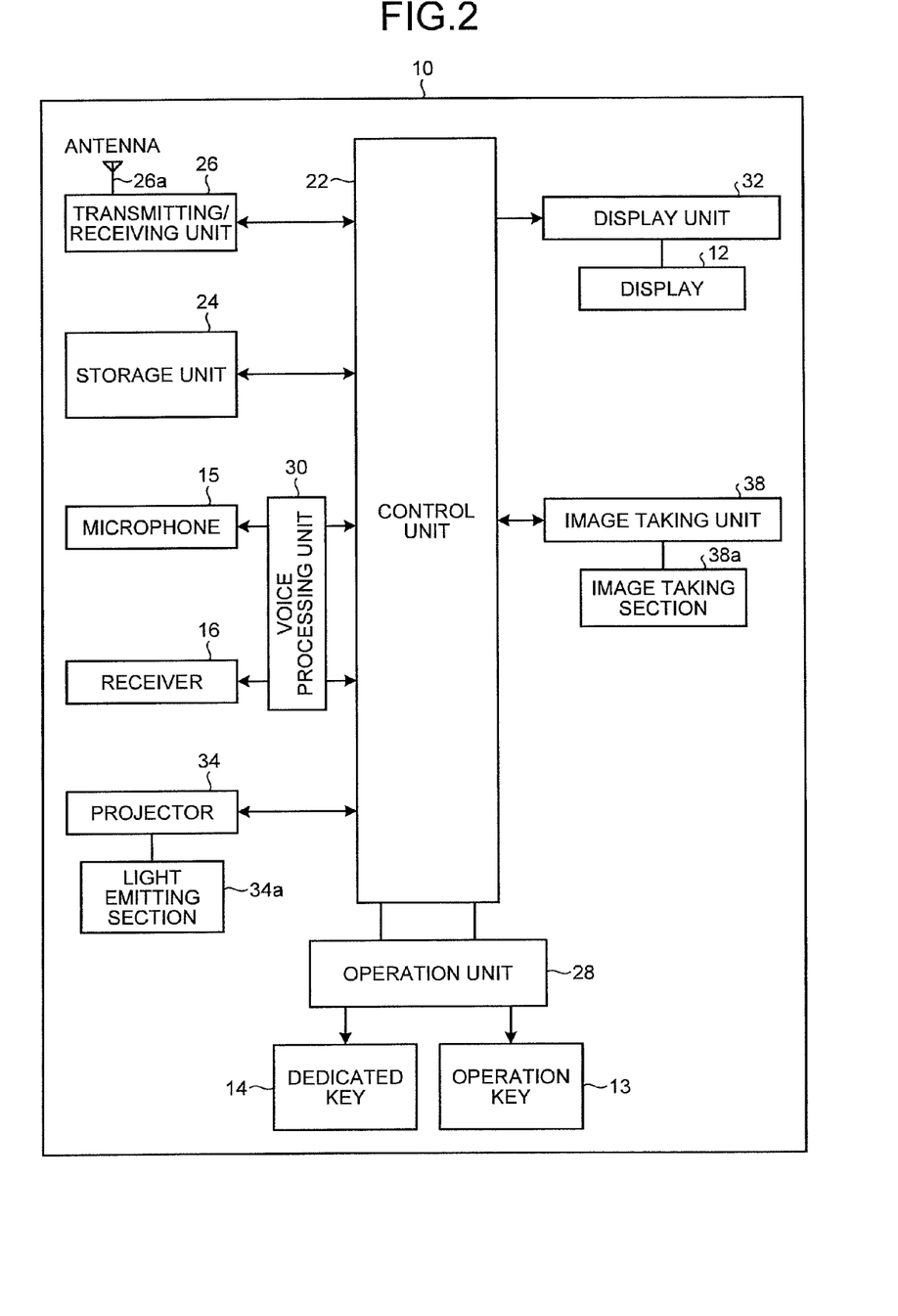
FIG. 2 is a functional block diagram of the configuration of the portable electronic device illustrated in FIG. 1.

FIG. 2 is a functional block diagram of the configuration of the portable electronic device illustrated in FIG. 1. As illustrated in FIG. 2, the portable electronic device 10 includes a control unit 22, a storage unit 24, a transmitting/receiving unit 26, an operation unit 28, a voice processing unit 30, a display unit 32, the projector 34, and the image taking unit 38.

The control unit 22 is a processing unit, such as a CPU (Central Processing Unit), that integrally controls operations of the portable electronic device 10. In other words, the control unit 22 controls operations of the transmitting/receiving unit 26, the voice processing unit 30, the display unit 32, etc., so that various processes performed by the portable electronic device 10 are executed in an appropriate order according to the operation of the operation unit 28 and software stored in the storage unit 24 of the portable electronic device 10. The various processes performed by the portable electronic device 10 include, for example, voice calls transferred via a line switching network, composing and sending/receiving e-mails, Web (World Wide Web)-site browsing via the Internet, etc. The operations of the transmitting/receiving unit 26, the voice processing unit 30, the display unit 32, etc., include, for example, transmitting/receiving signals by the transmitting/receiving unit 26, inputting/outputting voice by the voice processing unit 30, displaying images by the display unit 32, projecting images by the projector 34, acquiring images by the image taking unit 38, etc.

The control unit 22 performs processes according to programs stored in the storage unit 24 (e.g., operating system programs and application programs). The control unit 22 is, for example, a microprocessor unit (MPU: Micro Processor Unit), and it executes the abovementioned various processes of the portable electronic device 10 in an order specified by the software. In other words, the control unit 22 sequentially reads instruction codes of operating system programs, application programs, etc., stored in the storage unit 24 to excuse the processes.

The control unit 22 has a function of executing two or more application programs. Application programs executed by the control unit 22 are, for example, an application program that is used to control the driving of the projector 34, an application program that is used to control the driving of the image taking unit 38, an application program that is used to activate various games, etc.

The storage unit 24 stores therein software and data that are used to perform the processes executed by the control unit 22 and it stores therein a task that activates the application program that is used to control the driving of the projector 34, a task that activates the application program that is used to control the driving of the image taking unit 38, a task that activates the application program that is used to activate various games, etc.

The storage unit 24 stores therein not only the above tasks but also, for example, communications, downloaded voice data, software that is used by the control unit 22 to control the storage unit 24, phone numbers and mail addresses, etc. It also stores therein a managed address book, audio files containing dial tones, ringtones, etc., temporal data that is used in a software processing process, etc. Moreover, the storage unit 24 stores therein image data that contains information about the size of a target object (object to be projected). Computer programs and temporal data that are used in a software processing process are temporarily stored by the control unit 22 in a work area that is assigned to the storage unit 24. The storage unit 24 is, for example, a nonvolatile storage device (a nonvolatile semiconductor memory, such as a ROM (Read Only Memory), a hard disk device, etc.,) and a read/write storage device (e.g., a SRAM (Static Random Access Memory), a DRAM (Dynamic Random Access Memory), etc.,).

The transmitting/receiving unit 26 has an antenna 26a and it establishes a wireless signal path based on a CDMA or the like between the portable electronic device 10 and a base station via a channel that is assigned by the base station to perform telephone communications and information communications with the base station.

The operation unit 28 is formed with, for example, the operation keys 13 and the dedicated key 14 that are assigned with various functions and that operate as a power key, a call key, numeric keys, character keys, direction keys, an enter key, a dialing key, etc. When the keys are input by an operation of a user, the operation unit 28 generates a signal in accordance with the input operation. The generated signal is then input to the control unit 22 as an instruction by the user.

The voice processing unit 30 processes voice signals that are input to the microphone 15 and voice signals that are output from the receiver 16. In other words, the voice processing unit 30 amplifies voice that is input from the microphone 15, then processes the voice by AD conversion (Analog Digital conversion), then performs signal processing, such as coding, thereby converting the voice to digital voice data, and then outputs the voice data to the control unit 22. When receiving voice data from the control unit 22, the voice processing unit 30 processes the voice data by DA conversion (Digital Analog conversion), then amplifies the voice data, thereby converting the voice data to an analog voice signal and then outputs the voice signal to the receiver 16.

The display unit 32 has a display panel (the above-mentioned display 12, etc.) that is made up of a liquid crystal display (LCD, Liquid Crystal Display), an organic EL (Organic Electro-Luminescence) panel, etc., and it displays a video and an image in accordance with video data and image data received from the control unit 22 on the display panel.

Figure 3:
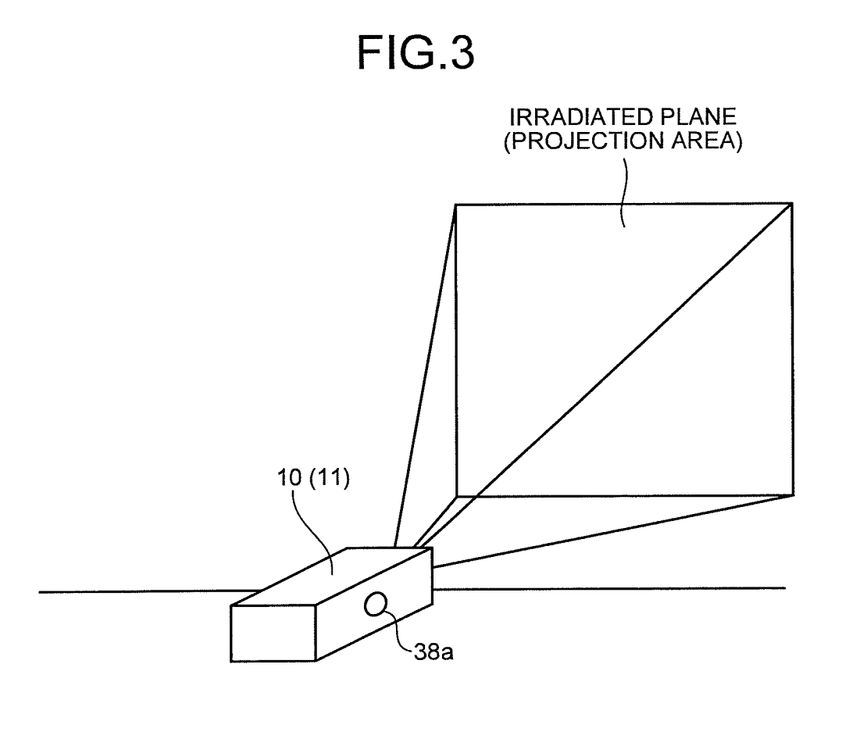
FIG. 3 is a diagram that illustrates a situation where the portable electronic device illustrated in FIG. 1 displays an image.

The projector 34 is an image projecting system that projects an image and, as described above, it has the light emitting section 34a on the upper surface of the housing 11 to project an image. FIG. 3 is a diagram that illustrates a situation where the portable electronic device illustrated in FIG. 1 displays an image. The portable electronic device 10 projects an image from the light emitting section 34a of the projector 34, i.e., emits light of an image, thereby projecting an image on a predetermined area (projection area) included in a surface, such as a wall surface and a screen, that faces the upper surface of the housing 11 as illustrated in FIG. 3. The projector 34 projects, under the control of the control unit 22, various images received from the control unit 22, such as cinemas and presentation materials, thereby displaying the images on the projection area.

The projector 34 includes a light source and an optical system that switches, in accordance with image data, modes whether to project light emitted from the light source. For example, the projector 34 can be a projector that has a light source, such as a halogen light, an LED light source, and an LD light source, and has an optical system, such as an LCD (Liquid Crystal Display), and a DMD (Digital Micro-mirror Device). With this configuration where such an optical system is arranged to cover the entire projection area in associated with each pixel, the optical system switches the light source to ON and OFF in accordance with an image, so that light emitted from the light source projects the image on the entire projection area. Alternatively, the projector 34 can be a projector that includes a light source that emits a laser beam, a switching element that switches whether to allow light emitted from the light source to pass through, and a mirror that enables raster scanning with light that has been passed through the switching element. With this configuration, an image is projected on the entire projection area by changing the angle of light emitted from the laser beam by the mirror and then scanning the entire projection area with the light emitted from the light source.

The image taking unit 38 is a system that acquires an image by using the image taking section 38a that is provided on a side surface of the housing 11. In other words, the image taking unit 38 acquires an image that is in a direction different from the direction in which the projector 34 emits light. The image taking unit 38 sends the image acquired from the image taking section 38a to the control unit 22.

Figure 4:
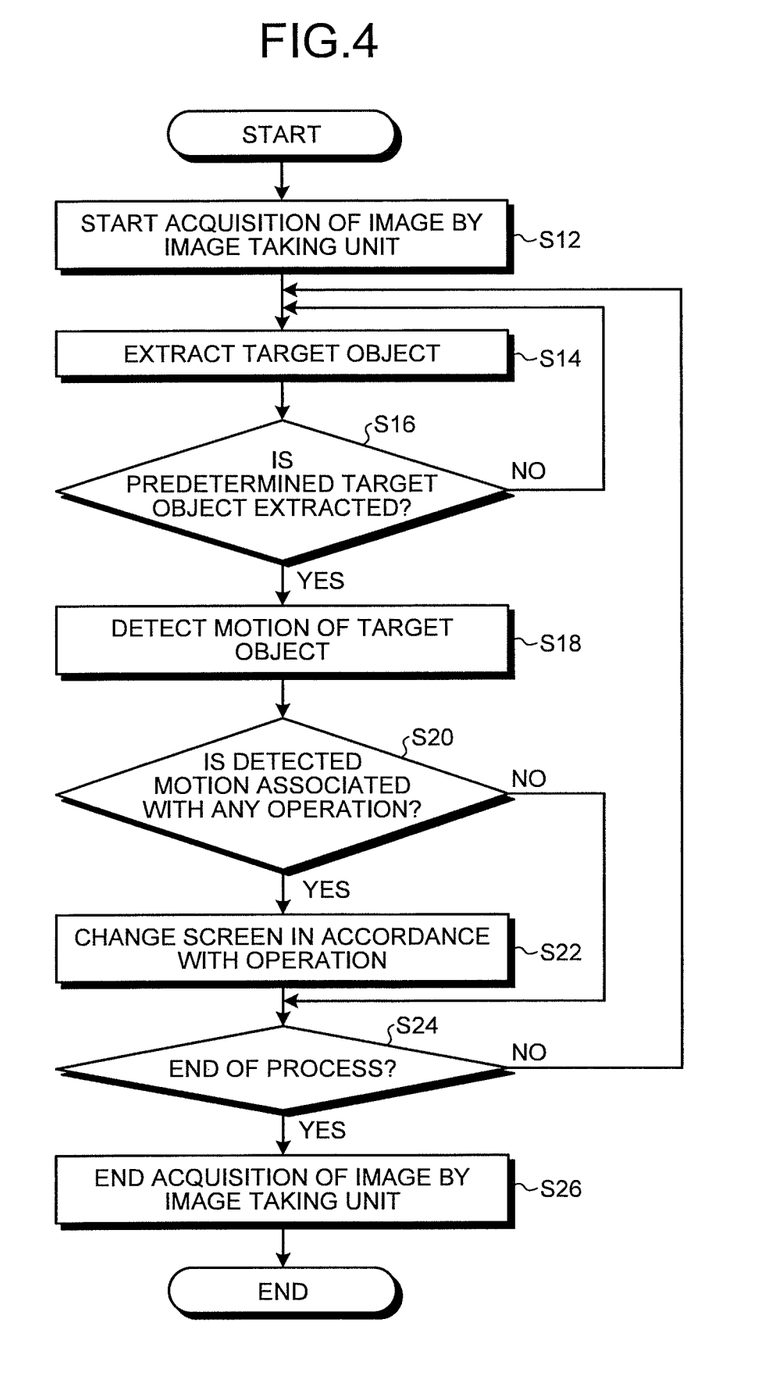
FIG. 4 is a flowchart of an example of the operations of the portable electronic device.

The operations of the portable electronic device 10 will be explained below with reference to FIG. 4. FIG. 4 is a flowchart of an example of the operations of the portable electronic device. The portable electronic device 10 has a mode to extract a target object from an image acquired by the image taking unit 38, detect a motion of the target object, and control (manipulate) an image to be projected from the projector 34 in accordance with the motion of the target object. Various image processing technologies can be used for a method of extracting a target object from an image. The relation between motions of the target object and image control is predetermined and pre-stored in the storage unit 24.

When, by an operation performed by the operator with the operation unit 28 or the settings, an instruction is input to set the mode ON to control an image in accordance with a motion of the target object acquired by the image taking unit 38, the control unit 22 starts the process and starts, at Step S12, acquisition of an image by the image taking unit 38. More particularly, the control unit 22 activates the image taking unit 38 and an image acquired from the image taking section 38a is sent to the control unit 22.

When the image acquisition is started at Step S12, the control unit 22 extracts, at Step S14, a target object from the taken image. More particularly, the control unit 22 analyzes the image acquired by the image taking unit 38 and extracts a target object from the image. If the control unit 22 fails to extract a target object from an acquired image, the control unit 22 extracts a target object from the next image (image taken a predetermined time later).

When a target object is extracted at Step S14, the control unit 22 determines, at Step S16, whether a predetermined target object is extracted. More particularly, the control unit 22 determines whether the target object extracted at Step S14 is a predetermined target object, i.e., a target object stored in associated with image control. If the control unit 22 determines that the target object extracted at Step S16 is not a predetermined target object (No), the process control goes to Step S14 and the control unit 22 extracts a target object from the next image. The control unit 22 repeats the processes of Steps S14 and S16 until a predetermined target object is extracted.

If the extracted target object is determined to be a predetermined target object at Step S16 (Yes), the control unit 22 detects, at Step S18, a motion of the extracted target object. In other words, the control unit 22 extracts the predetermined target object identified at Step S16 from a series of images within a given time and thereby detects a motion of the predetermined target object.

When a motion of the predetermined target object is detected at Step S18, the control unit 22 determines, at Step S20, whether there is an operation that is associated with the motion detected at Step S18. In other words, the control unit 22 determines whether the detected motion of the target object is a motion of a target object that is stored in associated with image control.

If it is determined at Step S20 that there is an associated operation (Yes), the control unit 22 changes, at Step S22, a screen in accordance with the operation detected at Step S20. In other words, the control unit 22 controls a screen in accordance with the detected operation instruction. The operation of the screen will be explained later. When the control unit 22 changes the screen at Step S22, the process control goes to Step S24. If the control unit 22 determines at Step S20 that there is no associated operation (No), the process control goes to Step S24.

When the determination at Step S20 is negative or when the process of Step S22 is performed, the control unit 22 determines, at Step S24, whether a process completion instruction is received. A process completion instruction is input by an input from the operation unit 28, an operation instruction detected through process from Steps S16 to S22, etc. If the control unit 22 determines, at Step S24, that the process is not to be completed (No), i.e., no completion instruction is input, the process control goes to Step S14 and repeats the processes from Steps S14 to S24. If it is determines, at Step S24, that the process is to be completed (Yes), i.e., a completion instruction is input, the control unit 22 stops, as Step S26, acquisition of images by the image taking unit 38 and the process goes to end.

As described above, because the portable electronic device 10 extracts a target object from an image taken by the image taking unit 38 and manipulates an image that is projected by the projector 34 or an image that is displayed on the display unit 32 in accordance with a motion of the target object (the regularity of the motion, the amount of the movement, and the momentum), the operator can manipulate the image just by moving the target object. Moreover, various motions can be set as motions of a target object and various operations can be set in associated with the motions. With this configuration, the operability of the image is increased.

In the present embodiment, a direction in which the projector 34 projects an image is different from a direction in which the image taking unit 38 takes an image (image acquiring direction), so that the target object is not dazzled by light when the target object is moving (i.e., when an operation instruction is input).

In a case where the housing 11 of the portable electronic device 10 is small, just like the present embodiment, there is the possibility that, when the operator operates the operation unit 28, the position at which an image is projected by the projector 34 is shifted to an incorrect position due to a movement of the housing 11. However, with the portable electronic device 10, the operator can manipulate an image without touching the housing 11. With this configuration, because it is unnecessary to move the housing 11 for the purpose of an operation, a shift of an image to an incorrect position is prevented and the image is not projected in an unintended direction.

Figure 5:
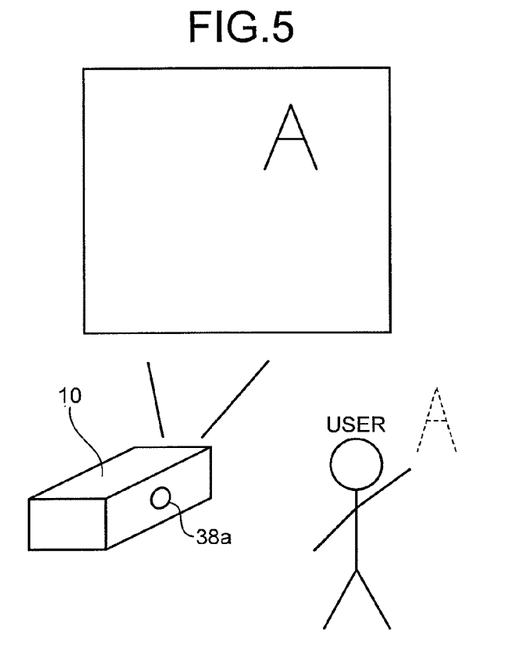
FIG. 5 is a diagram for explaining the operations of the portable electronic device.
Figure 6:
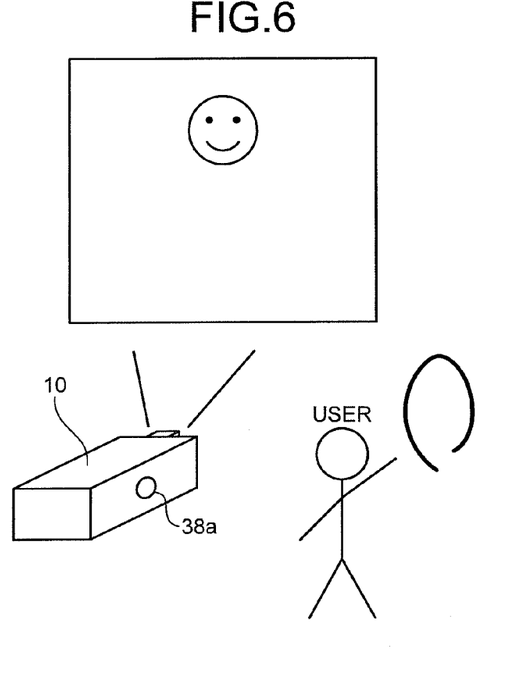
FIG. 6 is a diagram for explaining the operations of the portable electronic device.
Figure 7:
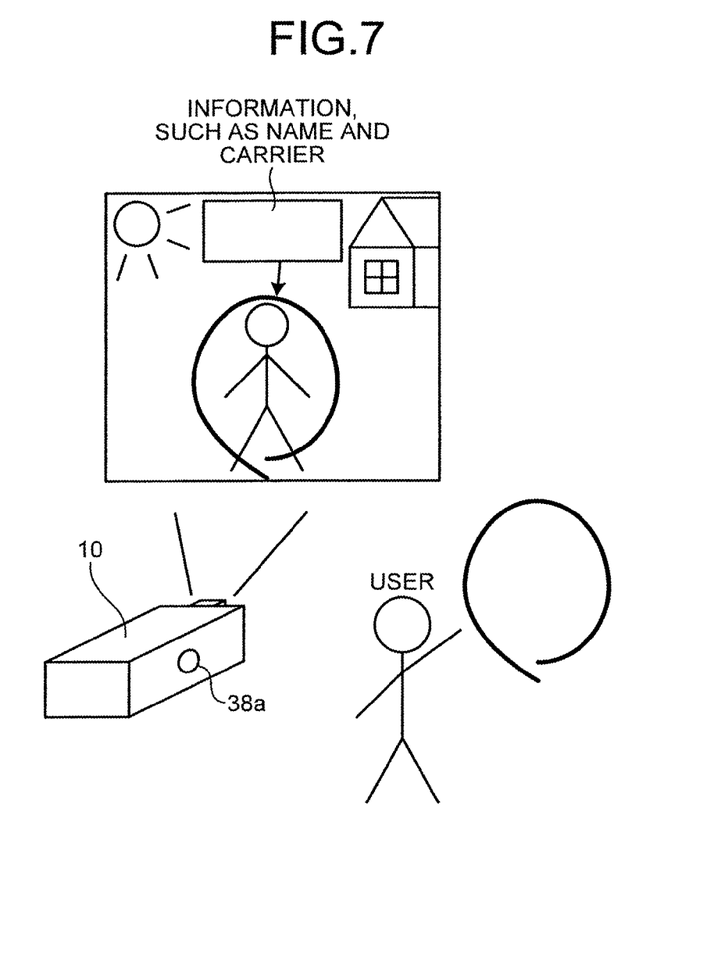
FIG. 7 is a diagram for explaining the operations of the portable electronic device.

The processes from Steps S16 to S22 will be explained more precisely below with reference to FIGS. 5 to 7. FIGS. 5 to 7 are diagrams for explaining the operations of the portable electronic device. In the examples illustrated in FIGS. 5 to 7, a hand of a person (end of a finger) is detected as a predetermined target object. The portable electronic device 10 projects an image by using the projector 34.

In the example illustrated in FIG. 5, the portable electronic device 10 stores therein motions of a target object in associated with characters. In this example, when the operator (user) makes, in an image acquiring area, i.e., an image taking area of the image taking section 38a, a motion of writing (drawing) a character with his/her hand in the air (in FIG. 5, writing the capital alphabet "A"), the image taking unit 38 acquires an image of a motion of writing a character by a target object. When the image taking unit 38 acquires an image of a motion of writing a character by a target object, the portable electronic device 10 analyzes the character written by the target object and displays the detected character by using the projector 34 in such a manner that the character overlaps with the projected image.

The position at which a character is displayed on the screen of the projector 34 can be various according to the settings. For example, it is allowable to display a character at the position at which the target object is present in the image taking area, i.e., a position that corresponds to the position of the target object in the acquired image. Alternatively, it is allowable to decide the display position in accordance with the relation between the referential point (the center) and the position of the hand, wherein the referential point is, for example, a predetermined portion of the target object, such as the head or the elbow of the user. In this case, it is allowable to, for example, calculate the distance between the elbow and the end of the hand by using image processing, set the distance to be a referential length, and determine the distance from the center on the screen. More particularly, the twice of the distance between the elbow and the end of the hand is set equal to the distance between the center of the image and the edge and the distance from the center of the image is then calculated by using the distance between the referential point and the end of the hand.

Because, as described above, a motion of writing a character by the target object is associated with a character input operation and a character is detected by analyzing a motion of the target object, the operator makes a motion of writing a character, facing the image taking unit 38, and thus the character is written on the screen. The control unit 22 can display a character written by the target object as it is of course, but the control unit 22 also can display the character in a predetermined font and style. Moreover, although, in the above embodiment, a character is input that is detected in a motion of the target object, it is allowable to draw a line directly along a motion the target object. In other words, it is allowable to display, when a target object makes a motion of drawing a figure or an illustration, the figure or the illustration drawn by the target object.

FIG. 6 illustrates an example in which the projector 34 of the portable electronic device 10 replays a moving image. Motions of a target object and operations of a moving image are stored in an associated manner. For example, the stored relation indicates that when the operator faces the image taking unit 38 and draws a right-hand (clockwise) circle with a target object (hand), it means fast-forward; when he/she draws a left-hand (counterclockwise) circle, it means fast-rewind; an up-and-down motion means stop; a right-and-left motion means replay, etc. It is allowable to change the fast-forward speed and the fast-rewind speed depending on the speed at which he/she draws a circle, i.e., the speed can be changed to the double speed or the triple speed.

If the above correspondence relation is stored, when the operator (user) makes, in an image acquiring area, i.e., an image taking area of the image taking section 38a, a motion of drawing a clockwise circle by waving his/her hand in the air, the image taking unit 38 acquires an image of a motion of drawing a clockwise circle by the target object. When the image taking unit 38 acquires a motion of the target object, the portable electronic device 10 analyzes the motion of the target object, performs an operation that is associated with the detected motion of the target object, and manipulates an image that is projected by the projector 34. In the present example, the moving image that is projected by the projector 34 is fast-forwarded.

As described above, because a displayed screen is manipulated i.e., an image is changed in accordance with a motion of the target object, the operator can change the image merely by moving his/her hand.

Although, in the example illustrated in FIG. 6, the associated operations are replay, stop, fast-forward, and fast-rewind, they are merely examples and the configuration is not limited thereto. If other operations, such as pause, skip, cueing, start and replay of a moving image, volume control, and brightness adjustment, are associated with motions of the target object, the operator can perform various operations just by moving the target object. If subtitles are displayed in a moving image, it is allowable to switch between subtitles display mode and hidden mode or the types of displayed subtitles by a motion of the target object.

Although, in the example of FIG. 6, an image that is displayed by the projector 34 is a moving image, if operations of a still image are stored in associated with motions of the target object, a still image can be manipulated variously in the same manner. For example, when two or more still images are displayed sequentially like a slide show, by a motion of the target object, the displayed image can go one image back, one image forward, or two images back and search for an image including a certain keyword.

FIG. 7 illustrates an example in which the projector 34 of the portable electronic device 10 replays (displays) a movies and a TV show. Motions of the target object and search operations are stored in an associated manner. In this example, when the portable electronic device 10 displays an image, the operator inputs a motion of enclosing a certain area included in the screen by moving the target object. In the example illustrated in FIG. 7, a motion of enclosing a person appearing on the screen is input. It is preferable that the control unit 22 displays a pointer indicative of the position of the target object on the screen to help the operator to enclose a desired area included in the screen.

The control unit 22 identifies a person who is displayed in the area enclosed by a motion of the target object, collects information about the person, and displays the information on the screen. Information displayed on the screen can be indicative of the name, the carrier (a film and a program he/she appears, the birthday) etc., of the identified person.

As described above, because information about a person who is displayed in the area enclosed by a motion of the target object is displayed, the operator can know about a person displayed on the screen. Moreover, because information about a person is displayed just by enclosing the person, the operator can acquire desired information with an easy operation.

The way in which the control unit 22 identifies a person who is displayed in the enclosed area is not limited thereto and various ways can be used. For example, an available person identifying way involves analyzing an image of an enclosed area, extracting a person from the image, and performing image matching (pattern matching) by comparing the image of the extracted person with images stored in a database (a database included in the portable electronic device 10 or an external database connected to the portable electronic device 10 via a communication path). Alternatively, as data of movies and TV shows to be replayed, not only image/voice data but also information indicative of a person who is displayed on each area of an image are stored or acquired. With this configuration, by using information indicative of an area enclosed by a motion of the target object and stored or acquired information indicative of a person who is displayed in each area of a certain image, a person who is in the enclosed area is identified. The way of acquiring information about an identified person is not limited thereto and it is allowable to display information that is stored in the storage unit 24 or display information that is acquired through a search of an external database via the Internet.

Although, in the above embodiment, information is displayed about a person who is displayed in an enclosed area, it is allowable to search for information about an object that is displayed in an enclosed area and then display the information. If music is output, it is allowable to display information about the output music as well as information about the displayed object. The determination whether information about an object or a person which/who is displayed on an image is to be displayed or whether information about music that is invisible in an image is to be displayed is performed in accordance with a motion of the target object. For example, when a predetermined area included in the screen is enclosed or a detected motion of the target object is a predetermined motion that does not indicate an area enclosing motion (such as a motion of writing a large cross mark and a simple right-and-left motion), information about music is displayed.

Figure 8:
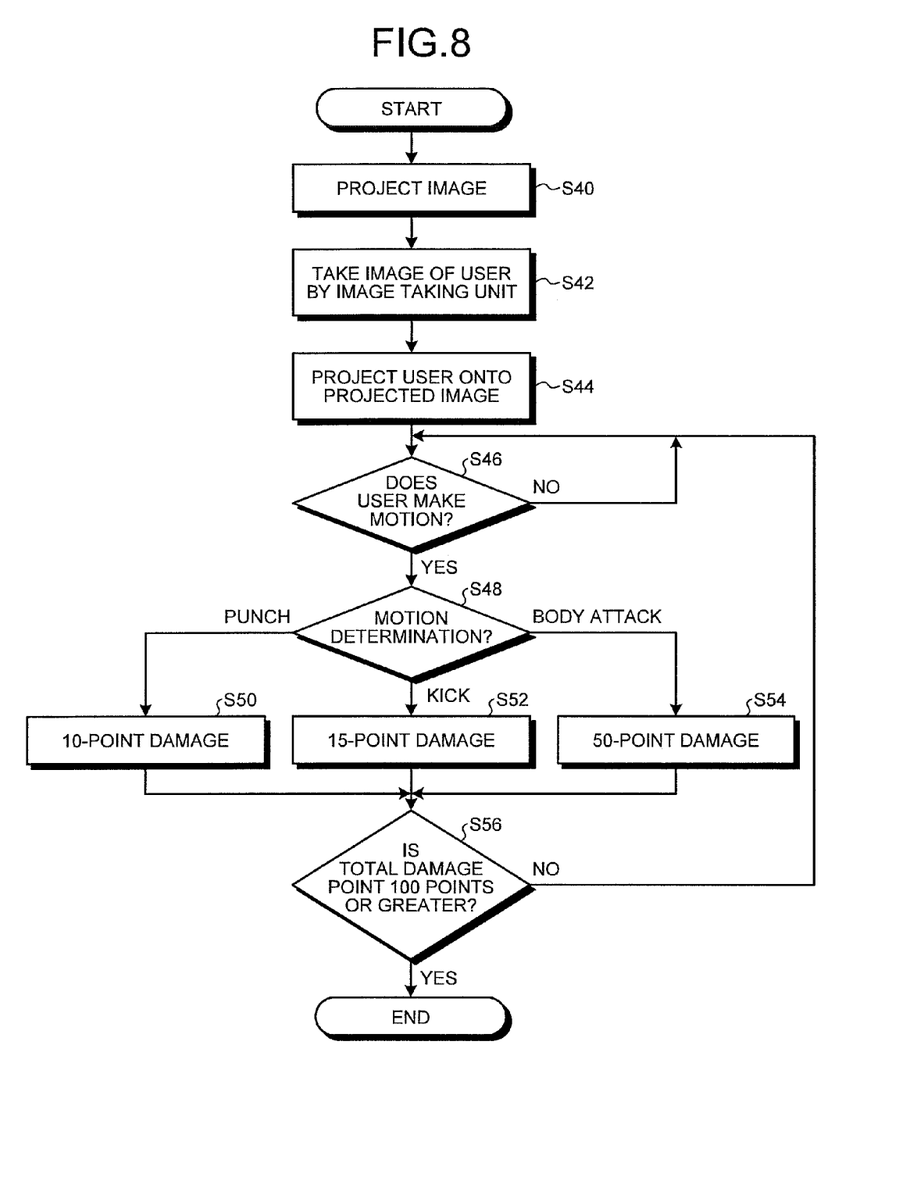
FIG. 8 is a flowchart that illustrates another example of the operations of the portable electronic device.
Figure 9:
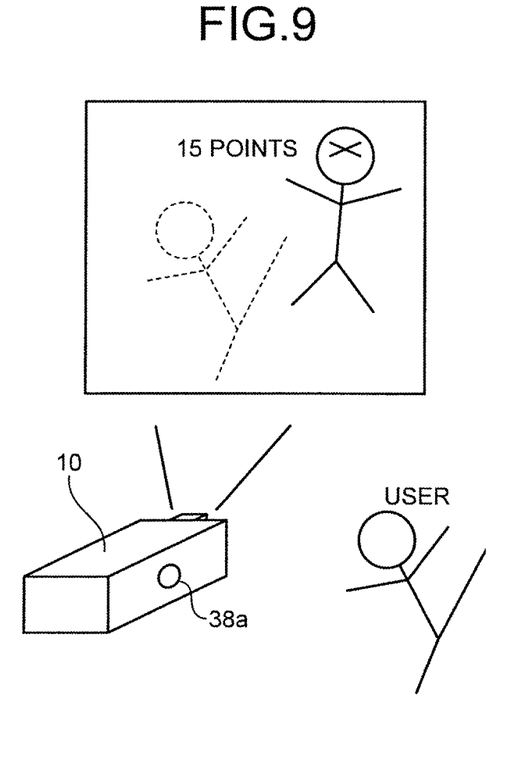
FIG. 9 is a diagram for explaining the operations of the portable electronic device.

Although, in the above embodiment, the target object is a hand of a person, the target object can be an entire human body. If the target object is an entire human body, the screen operation is performed in accordance with the entire motion of the target object. An example will be explained below with reference to FIGS. 8 and 9. FIG. 8 is a flowchart that illustrates another example of the operations of the portable electronic device. FIG. 9 is a diagram for explaining the operations of the portable electronic device. In the present example, the portable electronic device 10 executes a fighting game as application software.

When the fighting game is activated by an operation performed by the operator, the control unit 22 causes, at Step S40, the projector 34 to project an image. For example, the projector 34 projects the start screen of the fighting game for starting the game. The operator stands at a position so that his/her entire body is included in an image taking area of the image taking unit 38.

When an image is projected (image projection is started) at Step S40, the control unit 22 starts, at Step S42, acquisition of an images of the user (operator) by the image taking unit 38. In other words, an image of the image taking area is acquired by the image taking unit 38.

When the image taking unit 38 acquires an image, the control unit 22 extracts the user's entire body from the acquired image as a target object.

When a target object is extracted at Step S42 from the acquired image of the user, the control unit 22 projects, at Step S44, an image of the user on a projected image. In other words, the image of the target object acquired at Step S42 is combined with the image to be projected by the projector 34 and the combined image is projected by the projector 34. Therefore, an image containing the target object is projected by the projector 34. Moreover, the control unit 22 displays the target object at a position in the projected image corresponding to the position of the target object on the image acquired by the image taking unit 38. Because the fighting game is used in the present example, an image of an opponent who fights against the target object is also displayed on the projected screen.

The display form of the target object on the projected screen can be any form as long as the position of the target object on the screen, a motion of the target object, the positions of his/her hands and legs (more particularly, whether he/she puts his/her hand up or down), etc. are recognizable. Therefore, an image of the target object that is acquired by the image taking unit 38 can be displayed as it is on the projected image of course, but the target object can be indicated by a simple outline. In other words, it is allowable to display the target object in the form of a sign (icon). The target object can be indicated by a certain character instead of an image of the target object.

When the user is projected on the projected image at Step S44, the control unit 22 determines, at Step S46, whether the user makes a motion. More particularly, even after the process of Step S44, the control unit 22 extracts the target object from an image that is acquired by the image taking unit 38 and projects the extracted target object on the projected image while detecting a motion of the extracted target object. The control unit 22 determines whether a predetermined motion is detected at Step S46 (in the present example, any motion of punch, kick, and body attack). A determination of a predetermined motion is performed in accordance with a change of the extracted target object. In other words, when the target object is extracted, the control unit 22 identifies the hand sections, the leg sections, the body section, and the head section of the target object and extracts a motion of each section; therefore, it can perform a determination of a predetermined motion. For example, if the position of a hand moves largely than the other sections, it determines that a punch is detected. If the control unit 22 determines at Step S46 that the user makes no motion (No), the process control goes to Step S46 and the same process is repeated. In other words, the control unit 22 repeats the process of Step S46 until the user performs a predetermined process.

If the control unit 22 determines at Step S46 that the user makes a motion (Yes), the control unit 22 performs, at Step S48, a motion determination. In other words, the control unit 22 determines, at Step S48, the type of the motion, in the present example, any of punch, kick, body attack. If it is determined at Step S48 that the user makes a punch, the control unit 22 adds, at Step S50, 10 points to the damage point. If it is determined at Step S48 that the user makes a kick, the control unit 22 adds, at Step S52, 15 points to the damage point. If it is determined at Step S48 that the user makes a body attack, the control unit 22 adds 50 points to the damage point at Step S54. FIG. 9 illustrates a situation where the user makes a kick. Because an image of a kick by the user is acquired by the image taking unit 38, an image of the user that is projected by the projector 34 indicates a kick. Moreover, a notice is displayed on the screen that he/she gives a damage of 15 points and the opponent displayed on the screen is in a damaged mode. The initial damage point is 0 and damage points are added when the processes of Steps S50, S52, and S54 are performed.

When the processes of Steps S50, S52, and S54 are performed, the control unit 22 determines, at Step S56, whether the total damage point is 100 points or greater. If the control unit 22 determines at Step S56 that the damage point is less than 100 points, the process control goes to Step S46 and the above processes are repeated. Meanwhile, if the control unit 22 determines at Step S56 that the damage point is equal to or greater than 100 points, the process goes to end. It is allowable to display, before the end of the process, a message and an image to suggest that he/she beats the opponent. Moreover, when he/she starts a fight against the next opponent, the processes are repeated from Step S40.

As described above, because the user is extracted as a target object from an image taken by the image taking unit 38 and a motion of the user is detected, a user's physical motion becomes an input operation; therefore, an actual motion is allowed to be associated with a game operation. With this configuration, the operator can perform an intuitive operation and will enjoy the game more. Moreover, because no operation unit is needed, a simple device configuration is enabled.

Because, in the present embodiment, a direction in which an image is projected is different from a direction in which an image is acquired, the user can move while watching the screen and can be prevented from being dazzled by light projected directly toward him/her from the projector 34.

Although, in the above example, the game used is a fighting game, a running game, such as a marathon running game can also be used. If the game used is a running game, a scenery image is projected. When a user who is running is detected, the scenes of the projected image are switched in accordance with the running rhythm as if he/she were running; therefore, he/she feels like he/she is running. Alternatively, a fence jumping game is enabled by detecting motions, such as a jump and a crouch.

In such a game, it is allowable to detect the momentum of a user from the target object. By using the detected momentum of a user, it is possible to calculate calories the user burns up. More particularly, physical information about a user, such as the weight, and a calorie chart that contains calories in associated with physical motions are stored therein and the calories the user burns up is calculated in accordance with the relation between the detected user's motion and the calorie chart.

Although, in the above embodiments, part or the entire of a person is detected as a target object, the target object is not limited to a person as long as the screen is manipulated in accordance with a motion of a predetermined target object (specified target object) of an image acquired by the image taking unit 38. For example, it is allowable to use light having a predetermined wavelength band or a predetermined wavelength (e.g., a beam of a laser pointer) as a target object and manipulate a screen in accordance with a motion of the light. Because light having a predetermined wavelength band is used as a target object, a target object is easily extracted from an image acquired by the image taking unit 38.

It is allowable to set two or more different types of light having different wavelength bands or wavelengths, i.e., two or more different colors of light to be target objects and switch screen operations in accordance with the wavelength band of a detected target object. In other words, it is allowable to associate motions of a target object, wavelength bands of the target objects, and operations of a screen with each other and manipulate the screen in accordance with both a motion of a detected target object and the wavelength band of the target object. Because, as described above, operations are switched according to the wavelength band of light, different operations are input nevertheless motions are the same; therefore, more various operations are enabled.

When a motion of the target object and a detected character or a detected figure are displayed on a screen in accordance with a motion of the target object, it is allowable to change a motion of the target object and a detected character or a detected figure that are displayed on the screen in accordance with the color of the target object. With this configuration, the operator can write on the screen with various colors.

A blink of the target object can be detected as a motion of the target object. For example, it is allowable to associate a series of three blinks of the target object with power-off of the projector, i.e., image closing operation.

A wavelength band of light that is detected as a target object can be a wavelength band of invisible light. Because the light used is invisible, no one is dazzled even when a beam of the pointer hits his/her eyes.

The electronic device can align a direction in which an image is projected by the projector with a direction in which an image is acquired by the image taking unit. In other words, the image taking unit can acquire an image that includes an image that is projected by the projector. When a target object is detected from an image that includes an image that is projected by the projector, a target object is detected after the image projected by the projector is removed from the image acquired by the image taking unit by image processing. For example, when light having a predetermined wavelength band is detected as a target object, if light having the predetermined wavelength band is found in an image projected by the projector, the light that is found in the portion is not detected as a target object. With this configuration, a motion of the target object that is manipulated by the operator is detected more accurately.

Not only light having a predetermined wavelength band but also a pen or a stick can be used as target objects. For the purpose of taking away the need for an operator to have an additional item that is used to input a motion of the target object and achieving an easy configuration, the target object is preferably the entire human body or a predetermined portion of the human body.

The portable electronic device preferably has a sensor (distance measuring sensor) that measures the distance between the portable electronic device and a target object that is at a position to face the image taking unit. The presence of the sensor and the ability to measure the distance between a target object and the portable electronic device allow the portable electronic device to calculate the distance between the target object and the referential position and/or the target-object travel distance more accurately. With this configuration, the position of the target object on a projected image is calculated easily.

Although, in the above embodiment, an image that is projected by the projector 34 is manipulated, the display unit is not limited to the projector 34. It is allowable to manipulate an image that is displayed on a display device, such as a liquid crystal monitor.

The above-mentioned screen operation and the above-mentioned display are merely examples and the present invention is not limited to the above examples. Moreover, it is allowable to combine the above examples together. For example, it is allowable to, when a predetermined motion of the target object is detected, shift to a character input mode and detect a character in accordance with the motion of the target object.

Industrial Applicability

As set forth hereinabove, an electronic device according to the present invention is suitable for controlling an image display in accordance with a predetermined input operation.

The invention claimed is:

1. An electronic device control system, comprising:
a housing having a first face and a second face, the second face different from the first face;
an image display unit arranged on the first face, the image display unit configured to emit light in a first direction to project an image;
an image taking unit arranged on the second face, the image taking unit configured to take an image of a user in a second direction transverse to the first direction; and
a control unit configured to
detect a motion of the user from the image taken by the image taking unit,
estimate a momentum of the user based on weight and the motion of the user, and
change an image projected by the image display unit to another image, based on the estimated momentum,
wherein
the housing further has a third face different from the first face and the second face, the third face having thereon a display panel.

2. The electronic device control system according to claim 1, wherein
the third face of the housing has a first side and a second side, the second side longer than the first side,
the first face is connected to the third face along the first side,
the second face is connected to the third face along the second side, and
the first face is connected to the second face.

* * * * *